Patented Dec. 9, 1947

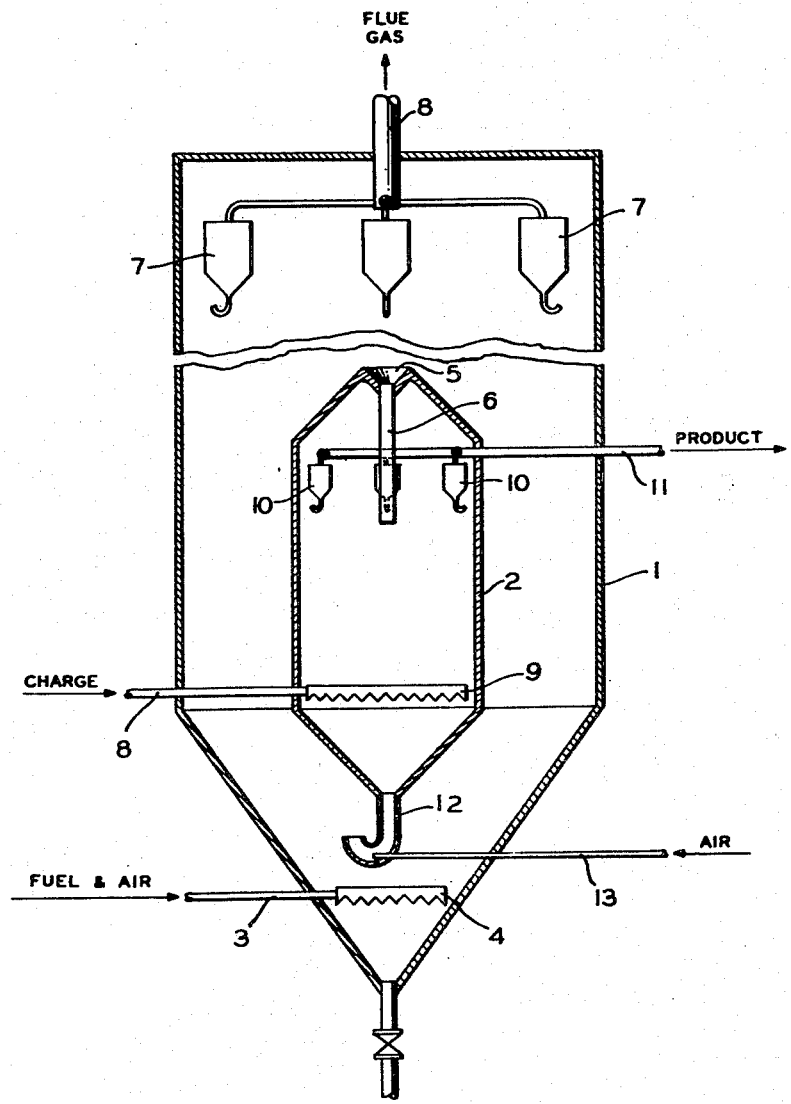
SYLVANDER C. EASTWOOD
LOUIS P. EVANS
INVENTORS

2,432,298

UNITED STATES PATENT OFFICE 2,432,298

PROCESS AND APPARATUS FOR THERMAL CONVERSION OF HYDROCARBONS

Sylvander C. Eastwood and Louis P. Evans, Woodbury, N. J., assignors to Socony-Vacuum Oil Company, Incorporated, a corporation of New York Application May 4, 1946, Serial No. 667,298

2 Claims. (Cl. 196—55)

This invention relates to a process for the thermal conversion of hydrocarbons by contacting the same with a highly heated powdered solid to thereby raise the temperature of the reactants to the desired level. The invention is also concerned with the apparatus peculiarly adapted for conducting said process.

The invention is particularly well suited to very high temperature thermal conversions at short reaction periods wherein accurate control of time and temperature must be observed throughout the entire body of reacting hydrocarbons to obtain maximum yields of best quality products. Essentially, the invention contemplates circulation of a powdered solid in a cyclic manner through a heating zone wherein it is suspended in a gaseous heating medium and a reaction zone wherein it is suspended in vapor phase hydrocarbon reactants. To avoid substantial temperature differentials between the central and peripheral portions of the reaction zone, the same is entirely enclosed within the heating zone, thus insuring only a very small temperature drop across the walls defining the reaction zone. By causing the reaction zone to be fed from solids settled in a central portion of the heating zone, it is possible to insure that only solids which have been properly heated will be conducted to and suspended in the hydrocarbon vapors in the reaction zone.

Although the invention does not exclude catalytic substances as the suspended solid, such catalytic materials are a less preferred embodiment and it is preferred that the suspended solid be a finely divided inert non-porous substance such as fused alumina, powdered zirconia or the like.

The temperatures of operation according to the invention vary considerably with the specific nature of the product to be obtained. Thus, ethylene can be produced at temperatures on the order of 1400° to 1600° F. by cracking of gas oil; while cracking of light hydrocarbon gases, for example propane, to produce acetylene, requires temperatures on the order of 2400° F. Pressures will also vary with the nature of the reaction and both temperature and pressure find their practical upper limit in the materials of construction available. Thus cracking to produce acetylene must be at near atmospheric pressure even though the apparatus be constructed of such materials as silicon carbide and high melting point alloys.

Preferably, contact of the solid with the reactant vapors is generally countercurrent while contact of the solid with the heating medium may advantageously be concurrent. Thus, the degree of turbulence and rate of gaseous flow in the heating zone is such that the powdered solid is carried upwardly to an enlarged portion of the heating zone wherein reduced velocity results in settling of the solid from the carrier heating medium into a dense phase suspension which is transferred to the reaction zone. On the other hand, turbulence and rate of flow in the reaction zone are so adjusted that the solid settles slowly through the reaction zone against upwardly moving vapor phase reactants.

It is accordingly a principal object of this invention to conduct a high temperature conversion of hydrocarbon reactants in the presence of a suspended highly heated solid by suspending the solid in a heating medium within a heating zone and suspending the so-heated solid in a vapor phase reactant within a reaction zone enclosed by the heating zone. The invention also contemplates an air injector to aid in removing settled solids from the bottom of the reaction zone and the introduction of additional powdered solids with that injector to make up for losses of solids during operation.

These and other objects of the invention, together with the advantages thereof, will be apparent from detailed consideration of a specific embodiment of the invention adapted to be practised in the apparatus shown in the single figure of the annexed drawings representing a vertical section through a typical apparatus.

A shell 1 encloses all the essential elements of the apparatus, both heating zone and reaction zone, the latter being defined by a shell 2 entirely enclosed by the outer shell 1. The outer shell 1 will, in practice, be heavily insulated, but no insulation is needed on shell 2 since it is positioned in the manner indicated in order to insure optimum temperature along its walls as well as the interior thereof.

In operation, both shells are filled with a dense phase suspension of a powdered solid in a gaseous medium. The gaseous medium in the heating zone between shells 1 and 2 is a high temperature gas such as products of combustion which may be supplied from a suitable combustion chamber or generated in the heating zone itself as shown here. To accomplish the latter purpose, fuel and air may be supplied by one or more pipes 3 to a suitable distributor means 4 in the lower portion of shell 1. Powdered solid admitted to the lower portion of shell 1 after being settled in shell 2 is suspended in the hot gases, heated thereby and carried to the upper portion of shell 1 through the space between sides of shells 1 and 2. In this space velocity is fairly high and the solid is readily carried to the top of shell 1 wherein the heating zone has a considerably greater cross-sectional area by virtue of the fact that none of its area is blocked off by shell 2. In this enlarged upper portion the powdered solid tends to settle out and settles most rapidly in the central portion without substantial resuspending effect from the gases rising at the sides. The solids thus settled in the middle of the enlarged upper portion of the heating zone flow to an opening 5 in the top of shell 2 from which they are conveyed by feed leg 6 to the reaction zone within shell 2. The exhaust gases from the heating zone enter suitable separators for throwing out entrained solids such as cyclone separators 7 from which the gases are transferred to an exhaust pipe 8 leading to a suitable economizer and thence to the stack.

The highly heated solids flowing as a dense phase suspension through feed leg 6, which may be choked near the bottom to regulate rate of flow and maintain the feed leg substantially full, flow into the reaction zone within shell 2 and are there suspended in the reactant vapors. The feed leg serves as a seal between the reaction zone and the heating zone. To control the level in the reaction zone, flow through the feed leg must be coordinated to other variables as by controlling back pressure against the vapor outlet of the reaction zone or by a throttling valve, not shown, in feed leg 6. Fresh charge is admitted by pipe 8 to a distributor 9 and may be either vaporous or liquid as charged. When it is desired to admit the charge as a liquid, residual heat of the powdered solids falling through reaction zone 2 serves to vaporize the charge at the distributor thus generating the vapors to rise through the reaction zone, taking up a suspension of highly heated solids which raises them to reaction temperature. In any case the rate of feed to the reaction zone is such as to permit the powdered solids to fall very slowly through the reaction zone thus, in effect, achieving a countercurrent contacting operation in dense phase and insuring that the reactants shall be at about the temperature of the admitted solids after leaving the zone of contact with the steam. A small proportion of the powdered solids may be carried upwardly above the bottom of pipe 6 and these will be removed from the product vapors by cyclone separators 10 before the product vapors are withdrawn from the system by pipe 11. It is generally desirable that the product vapors be promptly quenched and this can be accomplished by introducing cold oil or water to the vapor line 11 or by contacting the product vapors with a cold solid in either moving bed or suspended powdered form.

The powdered solid settling in the bottom of shell 2 will normally include some carbonaceous matter of coky or tarry nature deposited during the reaction. Combustion of this deposit is desirable and can be accomplished in the heating zone by introducing the suitable excess of air thereto. It is preferred that feed leg 12, provided for transfer of powdered solid from the reaction to the heating zone, be fitted with some means to choke or trap the solids therein and thus provide a seal between the zones. In the embodiment shown this is accomplished by a trap in the bottom of feed pipe 12 and a small amount of a gaseous medium is introduced to the trap by pipe 13 at a rate to induce flow of solids therein without blowing the trap clean. The injector effect of the air introduced from pipe 13 will normally prevent flow of air and products of combustion from the heating zone into the reaction zone and no serious harm results if a small amount of hydrocarbons flow from the reaction zone to the heating zone, since such hydrocarbons would merely afford additional fuel. It is to be seen therefore that the gas injection line 13 will itself furnish an adequate seal against flow in an undesirable direction but it is preferred that a seal be maintained in feed pipe 12 by a body of solids therein to prevent flow in either direction for purposes of economy. The gas introduced by line 13 may advantageously be additional air but steam or other inert gas may be introduced at this point if desired.

In an operation for conversion of ethane to acetylene, ethane is charged at 100° F. and the system is adjusted to maintain a weight ratio of 48 parts of solid heat transfer medium per part of ethane charge. A temperature drop of 300° F. is taken on the heated solid by introduction thereof to the reactor at 2500° F. and withdrawal at 2200° F. The principal products of the reaction are 55.5% wt. of ethylene, 30.7% wt. of acetylene and 10.4% wt. of methane. The vapor velocity through a dense phase suspension is limited to the carrying velocity for the average particle diameter present, thus permitting little flexibility with respect to contact time. The addition of steam can be employed to effectively vary this factor. In the specific example given above, the product vapors are immediately quenched with water, but variations in rate of cooling can also be used to vary the time during which the vapors are maintained at reaction temperature.

We claim:

1. A process for thermal cracking of hydrocarbons at high temperature which comprises maintaining a dense phase suspension of a powdered solid in hydrocarbon vapors within a reaction zone, maintaining a dense phase suspension of said powdered solid in a gaseous heating medium within a heating zone completely enclosing and in indirect heat transfer relationship with said reaction zone, supplying to said reaction zone a continuous stream of hydrocarbons to be heated in said reaction zone to reaction temperature by contact with said solid suspended therein, removing a continuous stream of reacted hydrocarbons from said reaction zone, settling a portion of the solid suspended in said reaction zone and transferring the settled solid to and suspending it in said heating zone, injecting air into said solid during said transfer to said heating zone, supplying to said heating zone continuous streams of fuel and air to thereby generate a gaseous heating medium, withdrawing from said heating zone a continuous stream of said gaseous medium, settling a portion of the heated suspended solid in said heating zone and flowing the hot solid settled in said heating zone as a dense phase suspension to said reaction zone.

2. A process for thermal cracking of hydrocarbons at high temperature which comprises maintaining a dense phase suspension of a powdered solid in hydrocarbon vapors within a reaction zone, maintaining a dense phase suspension of said powdered solid in a gaseous heating medium within a heating zone completely enclosing and in indirect heat transfer relationship with said reaction zone, supplying to said reaction zone a continuous stream of hydrocarbons to be heated in said reaction zone to reaction temperature by contact with said solid suspended therein, removing a continuous stream of reacted hydrocarbons from said reaction zone, settling a portion of the solid suspended in said reaction zone and transferring the settled solid to and suspending it in said heating zone, injecting a gas stream carrying fresh solid to make up for losses during operation into said settled solid during said transfer thereof from said reaction zone to said heating zone, supplying to said heating zone a continuous stream of gaseous heating medium, withdrawing from said heating zone a continuous stream of said gaseous medium, and transferring the hot solid from said heating zone as a dense phase suspension to said reaction zone.

SYLVANDER C. EASTWOOD.
LOUIS P. EVANS.

REFERENCES CITED

The following references are of record in the file of this patent:

UNITED STATES PATENTS

| Number | Name | Date |
|---|---|---|
| 2,378,342 | Voorhees | June 12, 1945 |
| 2,337,684 | Scheineman | Dec. 28, 1943 |